United States Patent

[11] 3,619,123

[72] Inventors Klaus Walz
Leverkusen-Wiesdorf;
Walter Hees, Cologne-Hoehenberg;
Mathieu Quaedvlieg, Opladen, all of
Germany

[21] Appl. No. 748,233
[22] Filed July 29, 1968
[45] Patented Nov. 9, 1971
[73] Assignee Farbenfabriken Bayer Aktiengesellschaft
Leverkusen, Germany
[32] Priority Aug. 7, 1967
[33] Germany
[31] F 53164

[54] PROCESS FOR DYEING FIBER MATERIALS OF SYNTHETIC POLYAMIDES WITH ACID DYESTUFFS
8 Claims, No Drawings

[52] U.S. Cl. .......... 8/173, 8/89, 8/178, 260/457
[51] Int. Cl. .......... D06p 3/24
[50] Field of Search .......... 8/90, 89, 93, 173, 178; 260/457

[56] References Cited

UNITED STATES PATENTS 2,058,489 10/1936 Murch et al. .......... 8/89 X
3,391,985 7/1968 Turbuchen et al. .......... 8/178
3,402,014 9/1968 Ucci .......... 8/173

*Primary Examiner*—George F. Lesmes
*Assistant Examiner*—T. J. Herbert
*Attorney*—Plumley, Tyner & Sandt

ABSTRACT: Process for dyeing synthetic polyamide fiber materials with acid dyestuff containing dye bath, the improvement comprising including in said dye bath, 0.5 to 2 percent by weight of the polyamide to be dyed, an aromatic sulfonic acid of the following formula:

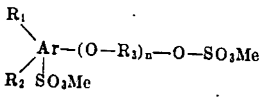

wherein Ar is an aromatic radical; $R_1$ and $R_2$ are H, cycloalkyl, aralkyl aryl or optionally substituted alkyl and together contain at least six carbon atoms; $R_3$ is alkylene or aralkylene; *n* is 0 or 1; and Me is a cation.

PROCESS FOR DYEING FIBER MATERIALS OF SYNTHETIC POLYAMIDES WITH ACID DYESTUFFS

The present invention relates to a process for dyeing fiber materials of synthetic polyamides with acidic dyestuffs. More particularly it concerns a process wherein the dyeing is carried out in the presence of aromatic sulfonic acids of the formula

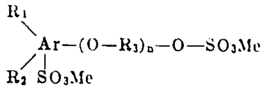

(I)

in which Ar denotes an aromatic radical, especially a benzene or naphthalene radical;

$R_1$ and $R_2$, independently of one another, denote hydrogen, a cycloalkyl, aralkyl or aryl radical or an optionally substituted alkyl radical, $R_3$ stands for an alkylene or an aralkylene radical;

*n* is the number 0 or 1; Me is a cation;

$R_1$ and $R_2$ together must contain at least six carbon atoms.

With regard to the symbols $R_1$ and $R_2$, the alkyl radicals primarily comprise those with one to 20 carbon atoms, for example, methyl, ethyl, i-propyl, hexyl, n- and i-octyl, nonyl, decyl, n- and i-dodecyl and hexadecyl radicals; the cycloalkyl radicals primarily include cyclohexyl radicals; the aralkyl radicals primarily include benzyl- and phenyl-ethyl radicals; and the aryl radicals are primarily phenyl and naphthyl radicals.

As substituents for the alkyl radicals are primarily mentioned hydroxy and carboxy groups.

For $R_3$ are mentioned as alkylene radicals primarily the ethylene radical and the substituted ethylene radicals, such as the propylene-1,2, butylene-1,2, and the 3-hydroxypropylene-1,2, radical and as aralkylene radicals primarily the phenyl ethylene radical.

Suitable cations Me are mainly the alkali metal ions, the ammonium ion and ammonium ions containing lower alkyl radicals, such as methyl, ethyl, 2-hydroxyethyl or cyclohexyl radicals.

The compounds to be used according to the invention can be prepared by sulfonation of hydroxyl compounds of the general formula

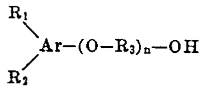

in which Ar $R_1$ $R_2$, $R_3$ and *n* have the same meaning as above, with sulfonating agents, such as sulfuric acid, sulfur trioxide, chlorosulfonic acid or amidosulfonic acid. Examples of hydroxyl compounds are hexylphenol, octylphenol, nonylphenol, dodecylphenol, hexadecylphenol, reaction products of oleyl alcohol or oleic acid with phenol or cresol, dibutylphenol, dihexylphenol, nonylcresol, cyclohexylphenol, cyclohexylethyl-phenol, hydroxydiphenyl, hydroxydiphenyl-methane, hydroxydiphenyl-propane, heptylnaphthol, and their reaction products with alkylene oxides, such as ethylene oxide, propylene oxide, butylene oxide, glycide and styrene oxide, or alkylene oxide mixtures.

The necessary amounts of compounds of the formula (I) to be used according to the invention can easily be established by preliminary experiments. In general, amounts of about 0.5 to 2 percent referred to the weight of material to be dyed, have proved satisfactory. For the process according to the invention such acid dyestuffs are used which usually serve for dyeing synthetic polyamide fiber materials.

The dyeing process according to the invention is suitable for all synthetic polyamides, such as polycaprolactam, polyhexamethylene-diamine adipate, or poly-11-amino-undecanic acid.

Dyeing of the polyamide fiber materials is usually carried out by introducing the material to be dyed in a lignor ratio of 1: 10–40 into an aqueous bath which has been heated to about 40° to 50° C. and contains the acidic dyestuffs, the compounds of the formula (I) to be used according to the invention, and acids, such as acetic acid or formic acid, then gradually raising the temperature of the dyebath to approximately 100° C. and keeping the dyebath at this temperature until it is exhausted. However, it is also possible to pretreat the polyamide material to be dyed, prior to the dyeing process proper, with a liquor which contains only the compounds of the formula (I) to be used according to the invention and the usual acids, by heating the material to be dyed in this liquor at 130° C. for about 5–20 minutes. After cooling to 40° C., the dyestuffs are added to the liquor which is then gradually heated to 98° to 120° C. and kept at this temperature for about 1 hour.

With the aid of the process according to the invention it is possible to dye the most varied materials of polyamide fibers, for example, flocks, cable sheathings, combed materials, yarns, fabrics, knitted fabrics or fleeces, with acidic dyestuffs in outstanding levelness; in particular, the streakiness which easily occurs in the dyeing of fabrics and knitted fabrics of synthetic polyamides, is obviated.

The dyestuff numbers given in the following examples refer to Color Index, 2nd Edition, Volume 3.

EXAMPLE 1

A fabric of polycaprolactam filaments is introduced in a liquor ratio of 1:40 into a bath which has been heated to 40° C. and contains, per liter, 0.065 g. of the dyestuff No. 18,835; 0,033 g. of the dyestuff No. 17,070; 0.055 g. of the dyestuff No. 62,055; 0.3 g. of glacial acetic acid and 0.35 g. of the compound of the formula

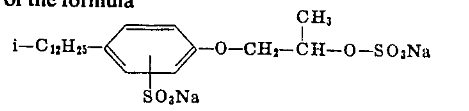

The dye bath is gradually heated to 98° C. and kept at this temperature for about 60 minutes. A grey dyeing of outstanding levelness is obtained.

Equally good results can be obtained when the levelling agent used above is replaced with one of the following compounds:

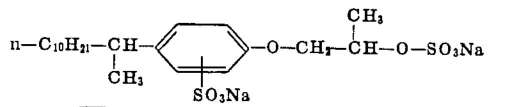

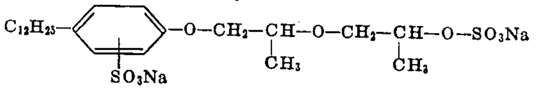

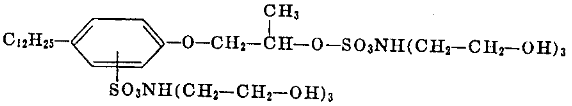

EXAMPLE 2

A knitted fabric of polyhexamethylene-diamine adipate filaments is introduced in a liquor ratio of 1:30 into a both which has been heated to 40° C. and contains, per litre, 0.4 g. glacial acetic acid and 0.5 g. of the compound

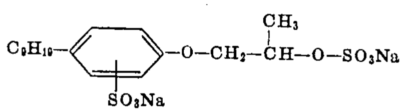

The bath is gradually heated to 130° C. and kept at this temperature for a short time. It is then cooled to 40° C. Subsequently there are added, per liter of liquid, 0.09 g. of the dyestuff No. 18,835; 0.043 g. of the dyestuff No. 17,070; and 0.1 g. of the dyestuff described in the third paragraph of example 1 of German Pat. specification No. 823,912. The dyebath is gradually heated to 115° C. and kept at this temperature for about 60 minutes. A silver-grey dyeing of outstanding levelness is obtained.

Equally good results can be obtained when the levelling agent used above is replaced with the following compounds:

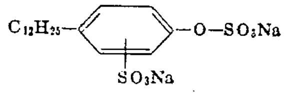

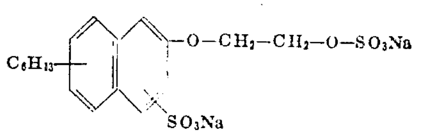

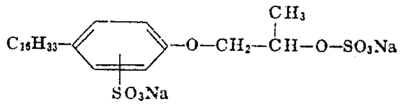

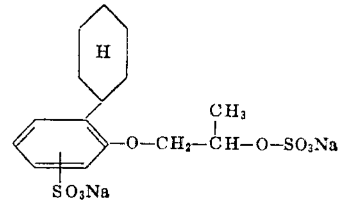

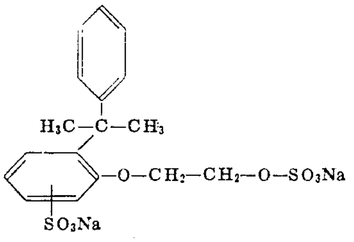

We claim:

1. In the process for dyeing fiber materials of synthetic polyamides with a dye bath containing acidic dyestuffs, the improvement comprising including in said dye bath an aromatic sulfonic acid of the formula

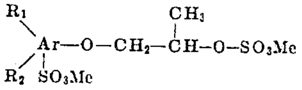

in which Ar is an aromatic radical;

$R_1$ and $R_2$, independently of one another, are hydrogen, cycloalkyl, aralkyl, aryl or optionally substituted alkyl radicals;

$R_3$ is an alkylene or an aralkylene radical;

*n* is 0 or 1;

Me is a cation; and $R_1$ and $R_2$ together contain at least six carbon atoms.

2. The process of claim 1 wherein said aromatic sulfonic acid has the formula wherein $R_1$, $R_2$ and Me have the same meaning as set forth in claim 1.

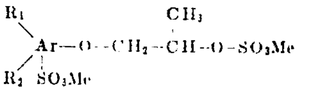

3. The process of claim 1 wherein $R_1$ and $R_2$ are selected from the group consisting of alkyl containing one to 20 carbon atoms; cyclohexyl; benzyl; phenyl-ethyl; dimethyl benzyl; phenyl and naphthyl.

4. The process of claim 1 wherein said aromatic sulfonic acid comprises 0.5 to 2 percent by weight of the polyamide to be dyed.

5. Synthetic polyamide fiber materials dyed according to the process of claim 1.

6. A composition for dyeing synthetic polyamide fiber materials comprising acid dyestuffs and an aromatic sulfonic acid of the formula

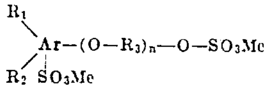

wherein Ar is an aromatic radical;

$R_1$ and $R_2$, independently of one another, are hydrogen, cycloalkyl, aralkyl, aryl or optionally substituted alkyl radicals;

$R_3$ is an alkylene or aralkylene radical;

*n* is 0 or 1;

Me is a cation; and $R_1$ and $R_2$ together contain at least six carbon atoms.

7. The dyeing composition of claim 6 wherein said aromatic sulfonic acid has the formula wherein $R_1$, $R_2$ and Me have the same meaning as set forth in claim 6.

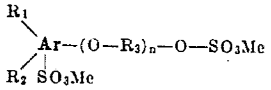

8. The dyeing composition of claim 6 wherein $R_1$ and $R_2$ are selected from the group consisting of alkyl containing one to 20 carbon atoms; cyclohexyl; benzyl; phenyl-ethyl; dimethyl benzyl, phenyl and naphthyl.

* * * * *

UNITED STATES PATENT OFFICE

CERTIFICATE OF CORRECTION

Patent No. 3,619,123 Dated Nov. 9, 1971

Inventor(s) Walz, Klaus, et al.

It is certified that error appears in the above-identified patent and that said Letters Patent are hereby corrected as shown below:

| Column | Line | Error |
|---|---|---|
| 2 | 63 | "both" should read ---bath---. |
| 3 | Cl. 1 formula | " 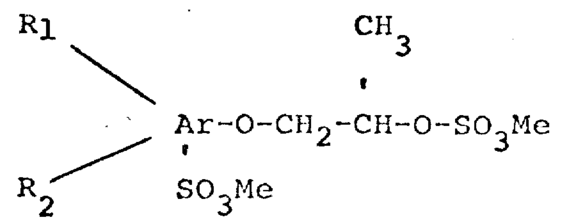 " should read --- 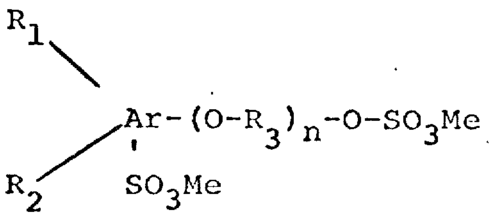 --- |

UNITED STATES PATENT OFFICE
CERTIFICATE OF CORRECTION

Patent No. 3,619,123 Dated Nov. 9, 1971

Inventor(s) Walz, Klaus, et al.

It is certified that error appears in the above-identified patent and that said Letters Patent are hereby corrected as shown below:

| Column | Line | Error |
|---|---|---|
| 4 | Cl. 2 | "wherein $R_1$, $R_2$ and Me have the same meaning as set forth in Claim 1" should follow the formula not precede it. |
| 4 | Cl. 3 | "dimethyl benzyl" should read ---α,α-dimethyl benzyl---. |
| 4 | Cl. 7 formula | " 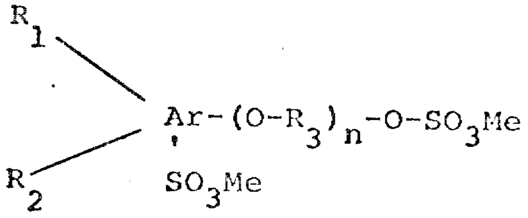 " should read --- 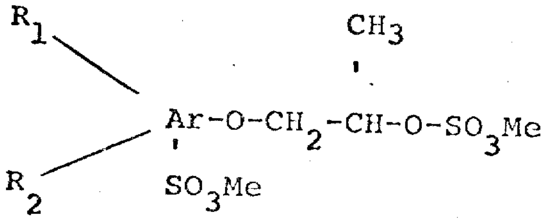 --- |

UNITED STATES PATENT OFFICE

CERTIFICATE OF CORRECTION

Patent No. 3,619,123 Dated Nov. 9, 1971

Inventor(s) Walz, Klaus, et al.

It is certified that error appears in the above-identified patent and that said Letters Patent are hereby corrected as shown below:

| Column | Line | Error |
|---|---|---|
| 4 | Cl. 7 | "wherein $R_1$, $R_2$ and Me have the same meaning as set forth in Claim 6" should follow the formula not precede it. |
| 4 | Cl. 8 | "dimethylbenzyl" should read --- α,α-dimethylbenzyl--- |

Signed and sealed this 20th day of June 1972.

(SEAL)
Attest:

EDWARD M.FLETCHER,JR.
Attesting Officer

ROBERT GOTTSCHALK
Commissioner of Patents